(12) United States Patent
Felsenfeld et al.

(10) Patent No.: US 12,344,321 B2
(45) Date of Patent: Jul. 1, 2025

(54) VEHICLE BODY STRUCTURE

(71) Applicants: NISSAN NORTH AMERICA, INC., Franklin, TN (US); NISSAN MOTOR CO., LTD., Yokohama (JP)

(72) Inventors: Aaron Felsenfeld, Sylvan Lake, MI (US); Yuichi Igarashi, Sagamihara (JP); Nicholas Trifonoff, Commerce Township, MI (US)

(73) Assignees: NISSAN NORTH AMERICA, INC., Franklin, TN (US); NISSAN MOTOR CO., LTD., Yokohama (JP)

( * ) Notice: Subject to any disclaimer, the term of this patent is extended or adjusted under 35 U.S.C. 154(b) by 358 days.

(21) Appl. No.: 17/958,175

(22) Filed: Sep. 30, 2022

(65) Prior Publication Data

US 2024/0109601 A1 Apr. 4, 2024

(51) Int. Cl.
*B62D 25/20* (2006.01)

(52) U.S. Cl.
CPC ..... *B62D 25/2036* (2013.01); *B62D 25/2027* (2013.01)

(58) Field of Classification Search
CPC ............ B62D 25/2036; B62D 25/2027; B62D 25/025; B62D 25/2009; B62D 65/024; B62D 65/022; B62D 65/02; B23P 19/10; Y10T 29/49902; Y10T 29/49895; B23K 2101/006
See application file for complete search history.

(56) References Cited

U.S. PATENT DOCUMENTS

| | | | |
|---|---|---|---|
| 8,820,819 B2 * | 9/2014 | Tamaki | B62D 25/2009 296/65.05 |
| 9,789,907 B2 | 10/2017 | Yang et al. | |
| 2010/0244496 A1 | 9/2010 | Bellanger et al. | |
| 2018/0086403 A1 * | 3/2018 | Kawasaki | B23P 19/10 |
| 2018/0201091 A1 * | 7/2018 | Bodey, Jr. | B62D 25/08 |
| 2020/0148292 A1 * | 5/2020 | Hosbach | B62D 65/04 |

FOREIGN PATENT DOCUMENTS

KR   19980062461 A   10/1998

OTHER PUBLICATIONS

CN 102795268 A (Year: 2012).*
DE 102013219288 A1 with English Translation (Year: 2015).*

* cited by examiner

*Primary Examiner* — Lori Lyjak
(74) *Attorney, Agent, or Firm* — Global IP Counselors, LLP (57) ABSTRACT

A vehicle body structure includes a floor structure, a rear side member and a reinforcing member. The floor structure at least partially defines a door sill portion, a rear wheel well portion and a rear seat support portion. The rear side member extends wider and is directly attached to a lower surface of the floor structure adjacent to the door sill portion and a forward section of the rear wheel well portion. The reinforcing member is fixedly attached to an upper surface of the floor structure adjacent to the door sill portion and the forward section of the rear wheel well portion such that a portion of the floor structure, a portion of the reinforcing member and a portion of the rear side member are welded together via a plurality of triple welds.

18 Claims, 8 Drawing Sheets

VEHICLE BODY STRUCTURE

BACKGROUND

Technical Field

The present disclosure generally relates to a vehicle body structure that includes a reinforcing member located between a rear wheel well and a second-row seat supporting area of a floor structure of the vehicle. More specifically, the reinforcing member welded to a portion of the floor immediately above a rear side member of the vehicle body structure in a 3-layer weld with the reinforcing member and the rear side member sandwiching the floor structure therebetween.

Background Information

Vehicle body structures manufactured with a unibody construction design are unique in that the body panels of the vehicle body structure serve as portions of the vehicle body and also serve as structural elements.

SUMMARY

One object of the present disclosure is to provide a vehicle body structure with a reinforcing member that strengthens an area that includes a side floor panel, a rear side member and an adjacent door sill of the vehicle body structure.

In view of the state of the known technology, one aspect of the present disclosure is to provide a vehicle body structure with a floor structure, a rear side member and a reinforcing member. The floor structure at least partially defines a door sill portion, a rear wheel well portion and a rear seat support portion. The rear side member extends under and is directly attached to a lower surface of the floor structure adjacent to the door sill portion and a forward section of the rear wheel well portion. The reinforcing member is fixedly attached to an upper surface of the floor structure adjacent to the door sill portion and the forward section of the rear wheel well portion such that a portion of the floor structure, a portion of the reinforcing member and a portion of the rear side member are welded together via a plurality of triple welds.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
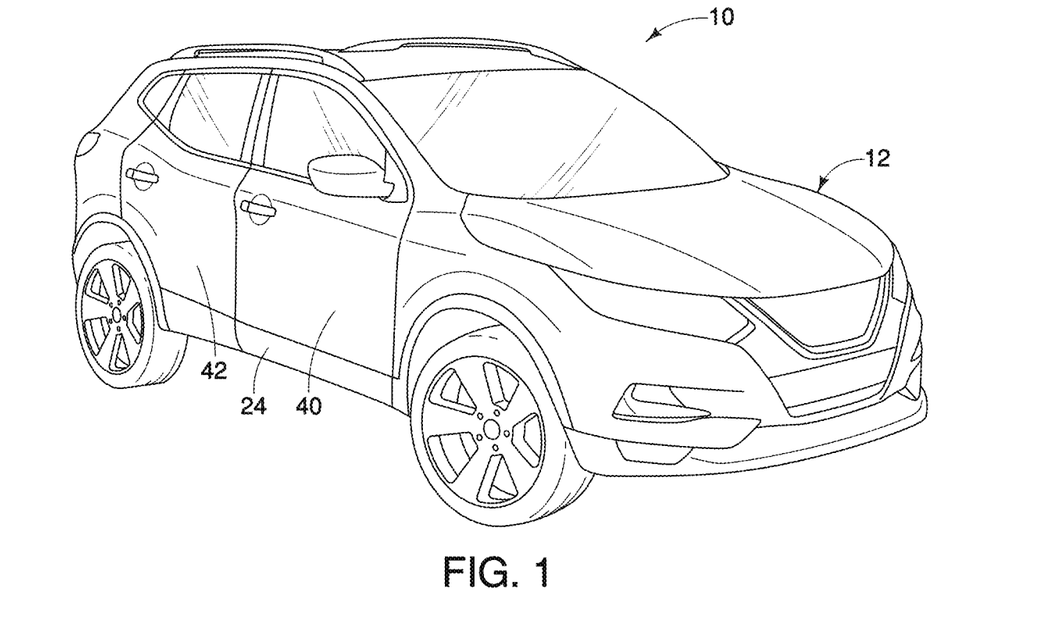
FIG. 1 is a perspective view of a vehicle that includes a vehicle body structure in accordance with an exemplary embodiment.
Figure 2:
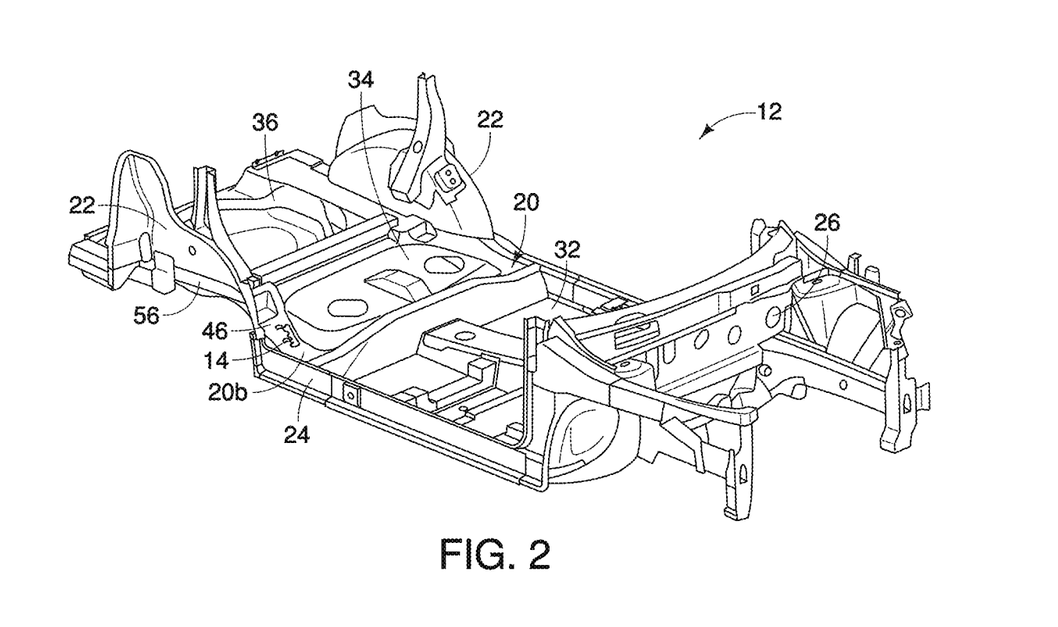
FIG. 2 is another perspective view of the vehicle body structure of the vehicle depicted in FIG. 1, with various panels removed showing a floor structure of the vehicle body structure and a reinforcing member welded to a portion of the floor structure in accordance with the exemplary embodiment.

Referring initially to FIGS. 1 and 2, a vehicle 10 having a vehicle body structure 12 that includes a reinforcing member 14 is illustrated in accordance with a first embodiment.

In the depicted embodiment, the vehicle 10 has a unibody construction. Many vehicles are built with a frame structure and a body structure that are attached to one another. A unibody vehicle includes various body panels and beam-like elements that integrated together define the frame and body of the vehicle body structure 12, as is well known in the art.

It should be understood from the drawings and the description herein that the vehicle 10 can be an sports utility vehicle (SUV), a coupe, a sedan or other vehicle design and is not limited to the depicted vehicle design.

The vehicle body structure 12 is shown in FIG. 2 with panels that define the upper body, including the passenger compartment, are removed showing a floor structure 20, inner wheel well portions 22, door sills 24 and an engine compartment 26. There are two reinforcing members 14, one on opposite sides of the vehicle 10. Only one reinforcing member is visible in FIG. 2. The areas of the vehicle body structure 12 that include the reinforcing members 14 are located at opposite sides of the vehicle 10. The areas of the vehicle body structure 12 and the reinforcing members 14 are basically identical accept that they are symmetrical mirror images of one another. Since the two areas of the vehicle body structure 12 that include the reinforcing members 14 are identical, only one side of the vehicle 10 is described herein below. However, it should be understood that description of one reinforcing member 14 applies equally to both and description of one side of the vehicle 10 and the vehicle body structure 12 applies equally to both sides of the vehicle 10 and the vehicle both structure 12.

The floor structure 20 includes a forward section 32, a rear seat support portion 34 and a cargo area section 36. The forward section 32 corresponds to a front seat area of the passenger compartment of the vehicle 10. The rear seat support portion 34 corresponds to a second-row seating area of the passenger compartment of the vehicle 10. The cargo area section 36 defines a floor of a cargo area of the vehicle 10 that can, alternatively correspond to a third-row seat area. The cargo area section 36 is located at least partially between the two inner wheel well portions 22 at the rear of the vehicle body structure 12.

The door sills 24 as depicted in FIG. 2 are elongated but define two sill areas with a forward sill area is located beneath a front door 40 (see FIG. 1) and a rearward sill area is located beneath a rear door 42. Each door sill 24 is divided by a B-pillar (not shown) that is installed the door sill 24 extending upward therefrom thereby defining front and rear door openings in a conventional manner.

Figure 3:
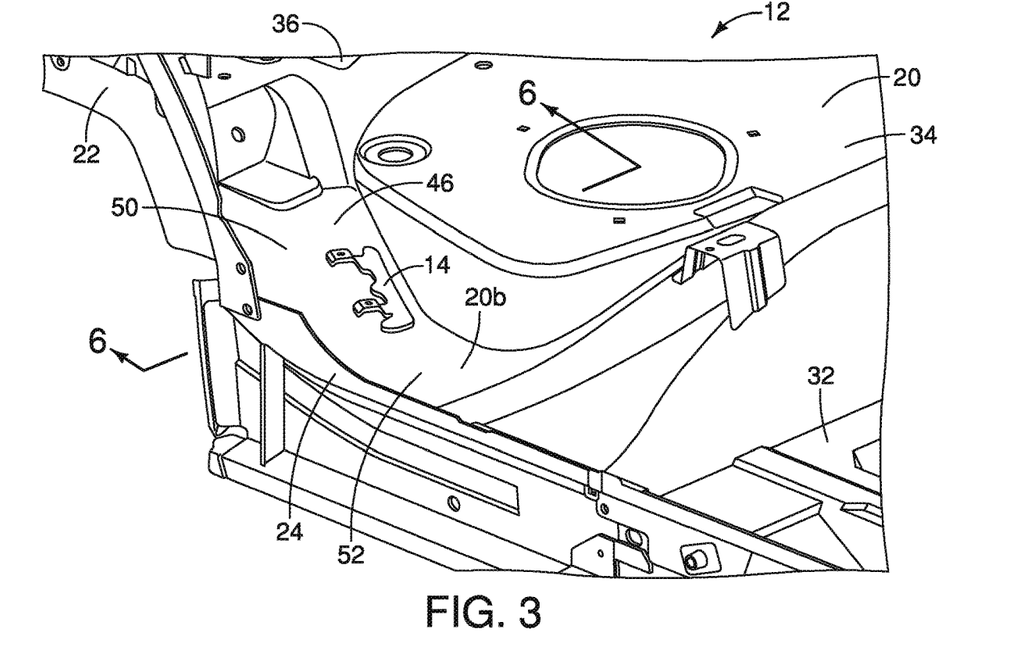
FIG. 3 is a perspective view a portion of the floor structure shown in FIG. 2, showing a side floor panel with the reinforcing member welded thereto in accordance with the exemplary embodiment.
Figure 4:
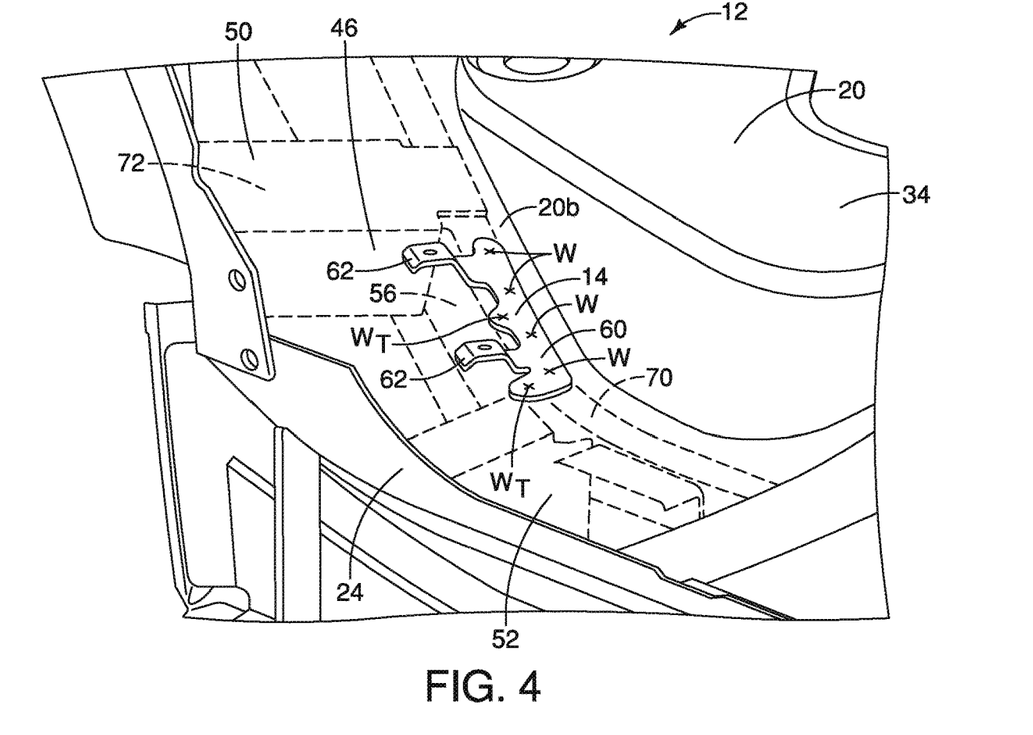
FIG. 4 is another perspective view of the vehicle body structure similar to FIG. 3 showing the side floor panel of the floor structure with the reinforcing member welded thereto and further showing a rear side member in phantom with the reinforcing member and the rear side member with the side floor panel of the floor structure sandwiched therebetween in accordance with the exemplary embodiment.
Figure 5:
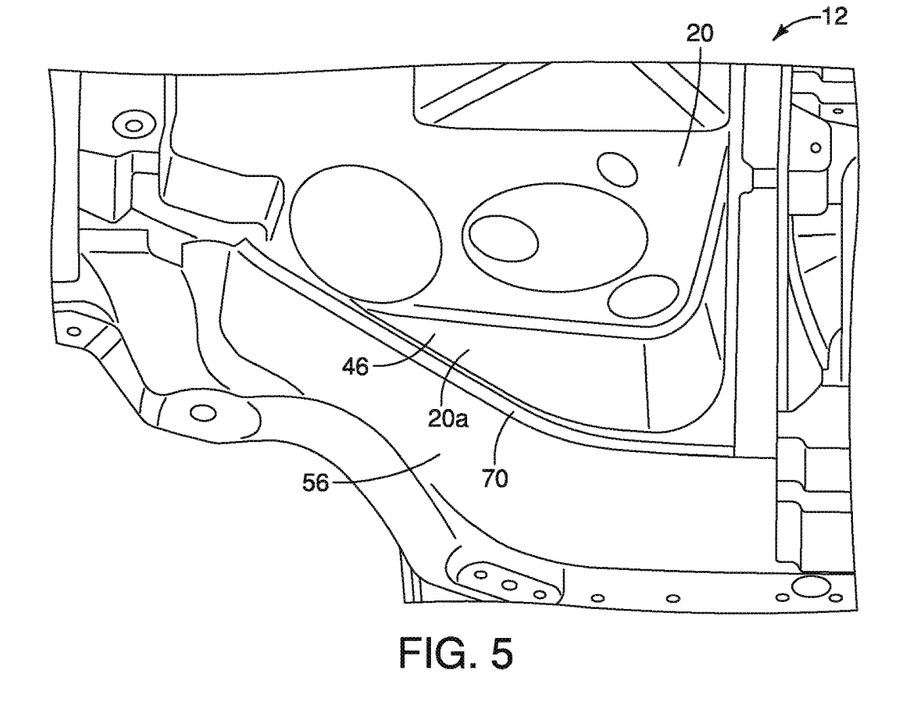
FIG. 5 is a perspective view of a lower surface of the floor structure showing the rear side member welded to the side floor panel in accordance with the exemplary embodiment.

Side floor panels 46 are installed at the either side of the rear seat support portion 34 of the floor structure 20. Only one side floor panel 46 is visible in FIG. 2. The side floor panel 46 has a rearward end 50 and a forward end 52, as shown in FIGS. 3 and 4. The rearward end 50 is higher than the forward end 52 of the side floor pane 46. Consequently, the side floor panel 46 has a curved shape, curving downward from the rearward end 50 to the forward end 52. The rear seat support portion 34 of the floor structure 20 extends along an inboard side of the side floor panel 46 and the rear end of the door sill 24 and a portion of the inner wheel well portion 22 extends along an outboard side of the rearward end 50 of the side floor panel 46, as shown in FIGS. 2 and 3.

The vehicle body structure 12 further includes a rear side member 56 that extends under and is directly attached to a lower surface 20a of the floor structure 20, as shown in phantom in FIG. 4. The rear side member 56 is positioned adjacent to the rearward end of the door sill portion 24 and a forward section of the inner wheel well portion 22 (also referred to as the rear wheel well portion 24).

The rear side member 56 is also shown in FIGS. 5-7 and 9-10. The rear side member 56 basically defines a beam when welded to the lower surface 20a of the floor structure 20.

As shown in FIGS. 3-4 and 6-10, the reinforcing member 14 is fixedly attached to an upper surface 20b of the floor structure 20 adjacent to the door sill portion 24 and the forward section of the rear wheel well portion 22. The reinforcing member 14 includes a main portion 60 and a pair of alignment portions 62.

A description of the reinforcing member 14 is now provided with specific reference to FIGS. 11-15, in FIGS. 11-15, the reinforcing member 14 is shown removed from the vehicle body structure 12.

The reinforcing member 14 has a main portion 60 and a pair of alignment portions 62, The main portion 60 is not planar but rather has a slight curvature that corresponds to the curvature of the side floor panel 46 where the main portion 60 is welded. The main portion 60 has a front end 60a, a rear end 60b, an upper surface 60c, a lower surface 60d, an outboard side 60f and an inboard side 60g. The front end 60a includes an outboard extending projection 60e. The alignment portions 62 are shaped and dimensioned to extend higher than the main portion 60, when welded to the floor structure 20. The alignment portion 62 are dimensioned and shaped such that a factory robot arm (not shown) can pick up the reinforcing member 14 using the alignment portion 62 and holes therein to align the reinforcing member 14 for precise positioning of the reinforcing member 14 to a predetermined position and orientation shown in FIGS. 3-4 and 6-10.

Figure 6:
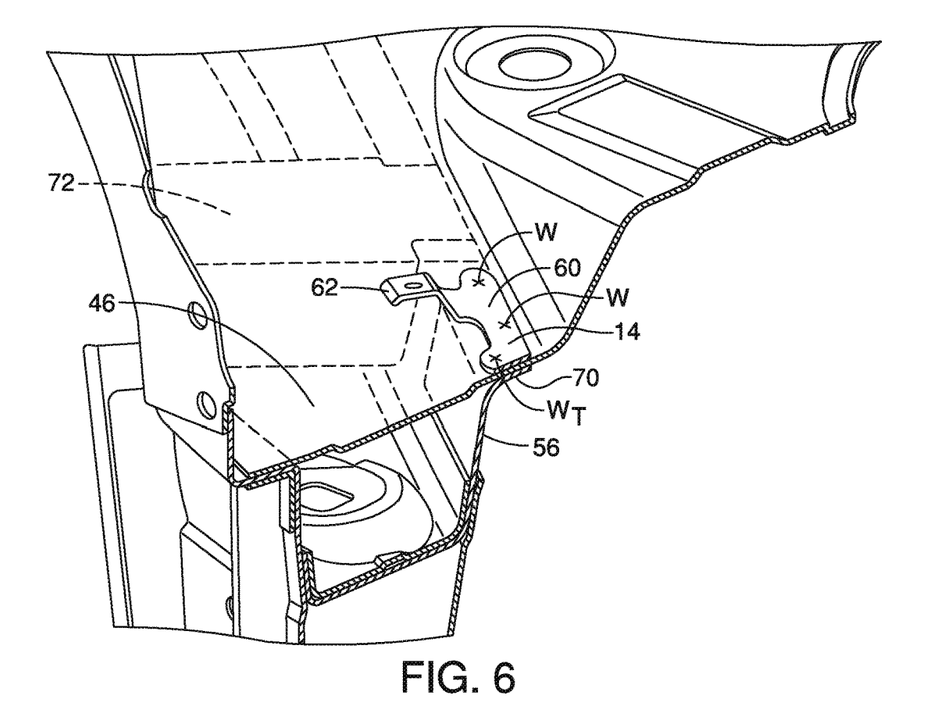
FIG. 6 is a cross-sectional view cross-sectional view taken along the line 6-6 in FIG. 3 showing a main portion of the reinforcing member, a portion of the side floor panel and a gusset of the rear side member welded to one another with a triple layer series of welds in accordance with the exemplary embodiment.
Figure 7:
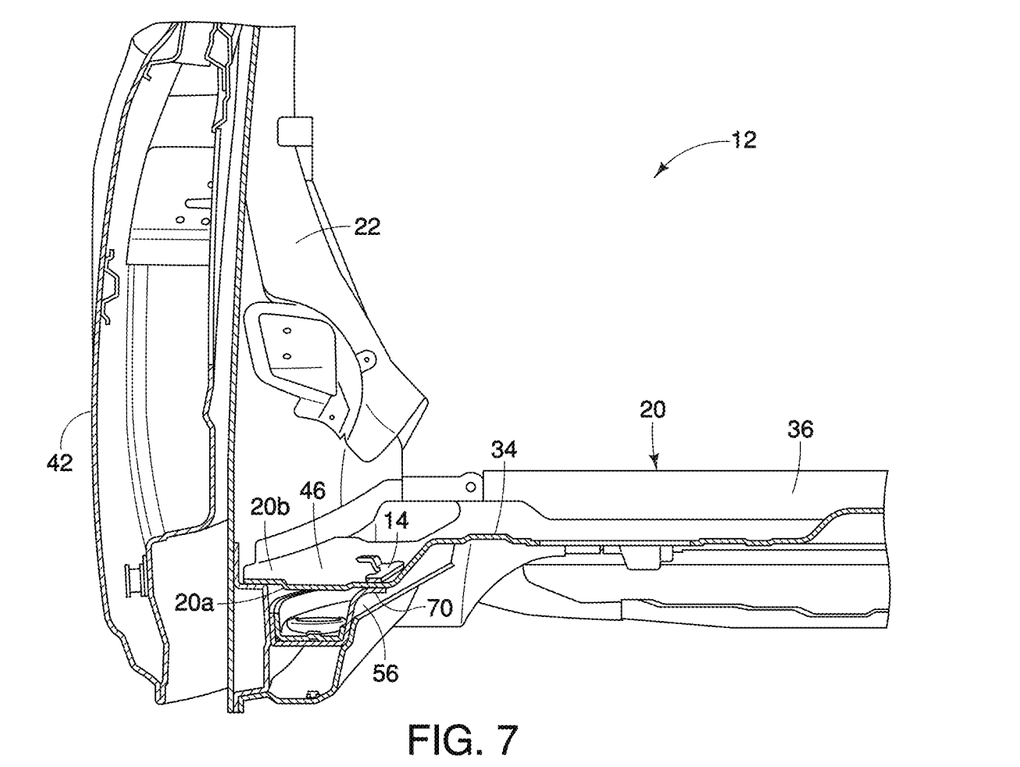
FIG. 7 is another cross-sectional view of the floor structure showing the main portion of the reinforcing member, the portion of the side floor panel and the gusset of the rear side member welded to one another with the triple layer series of welds in accordance with the exemplary embodiment.
Figure 8:
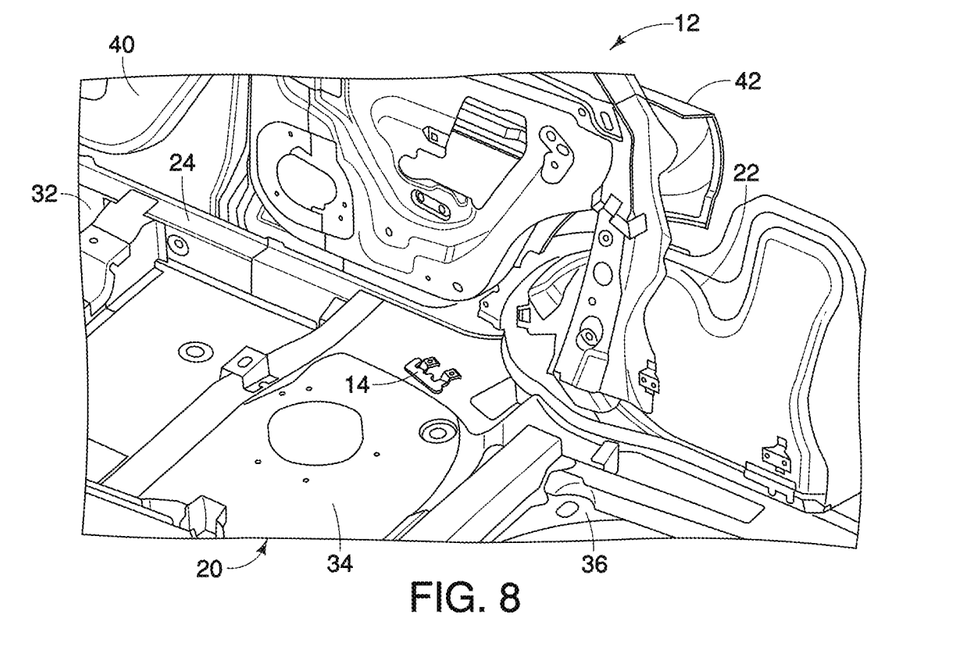
FIG. 8 is a rear perspective showing the floor structure with the reinforcing panel welded to the side floor panel in accordance with the exemplary embodiment.

When welded to the side floor panel 46 in the predetermined position and orientation, the lower surface 60d overlays a portion of the upper surface 20b of the side floor panel 46. Further, the main portion 60 of the reinforcing member 14 is positioned above a gusset portion 70 of the rear side member 56, as shown in FIGS. 4 and 6. More specifically, the main portion 60 is welded to the upper surface 20b of the side floor panel 46 directly above a gusset portion 70 of the rear side member 56. The robotically controlled welding process is such that the main portion 60, the side floor panel 46 and the gusset portion 70 are all welded together in a triple layer weld, as shown in FIGS. 6 and 7.

Figure 9:
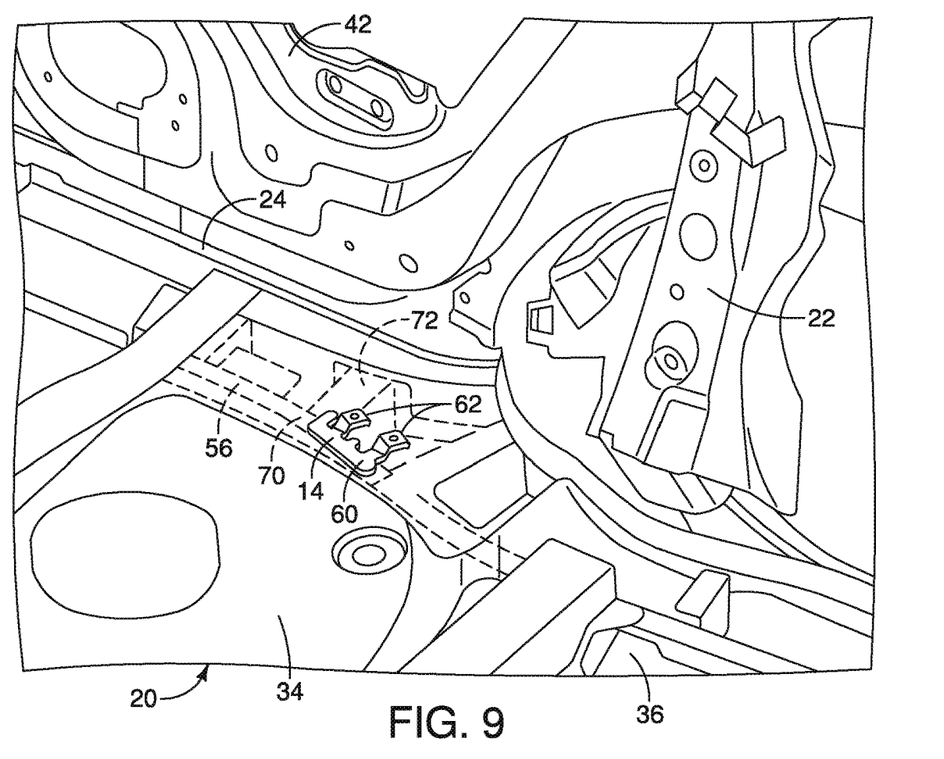
FIG. 9 is another rear perspective showing the floor structure with the reinforcing panel welded to the side floor panel and further showing the rear side member in phantom beneath the reinforcing panel in accordance with the exemplary embodiment.
Figure 10:
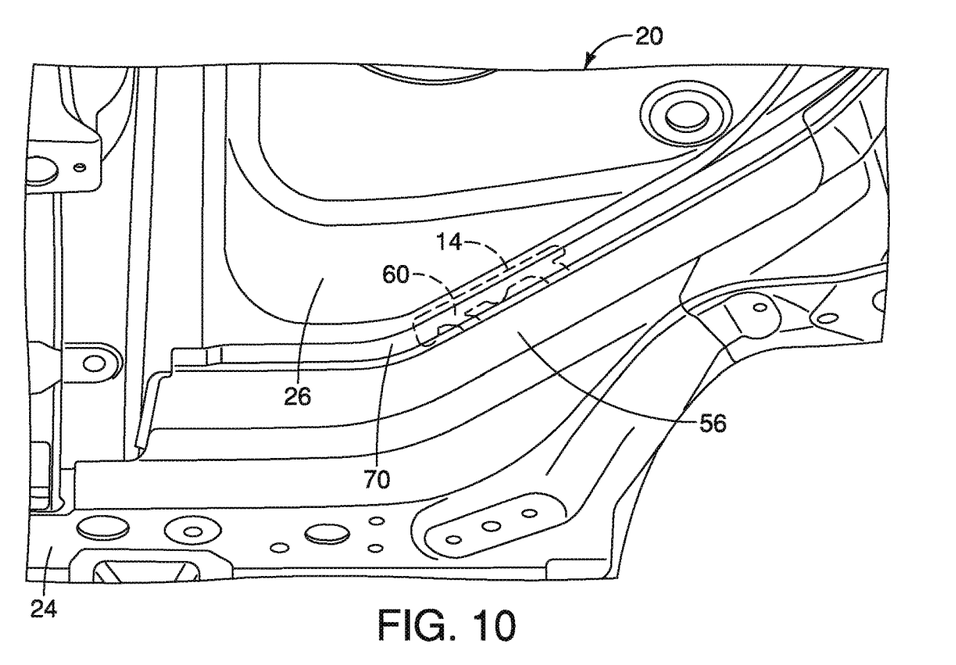
FIG. 10 is a bottom perspective view of the floor structure showing the rear side member and the side floor panel with the reinforcing member shown in phantom in accordance with the exemplary embodiment.
Figure 11:
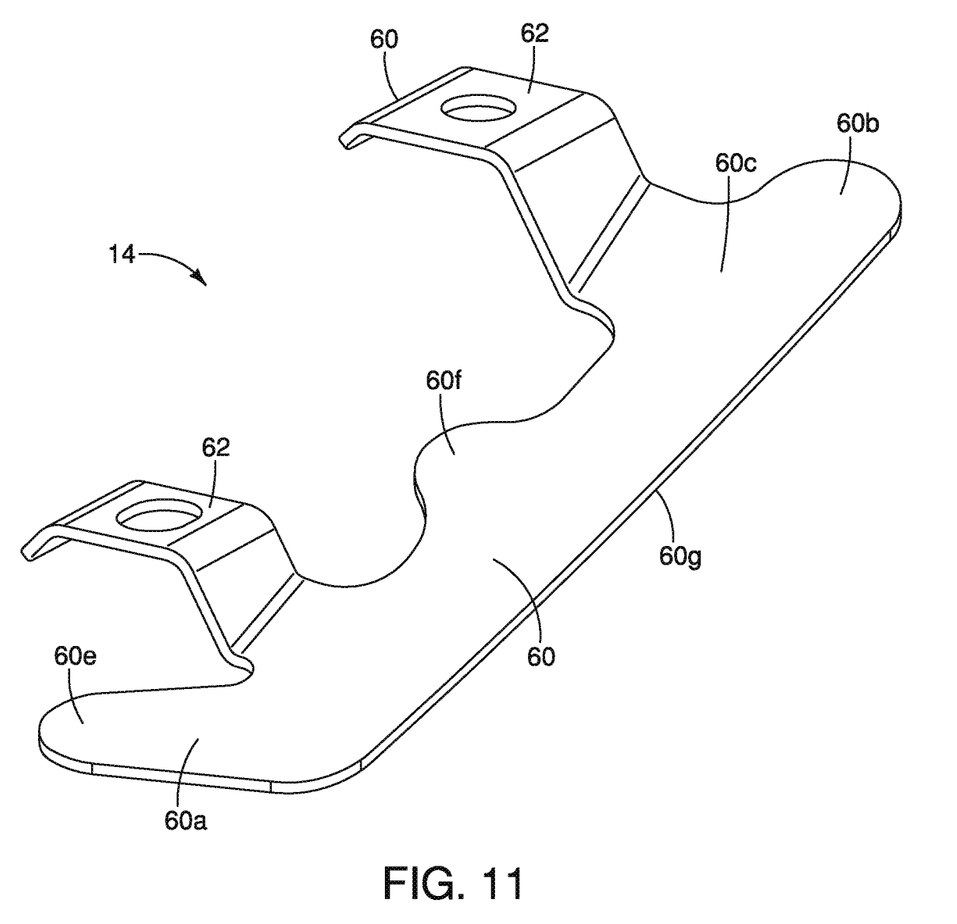
FIG. 11 a front perspective view of the reinforcing panel shown removed from the vehicle in accordance with the exemplary embodiment.
Figure 12:
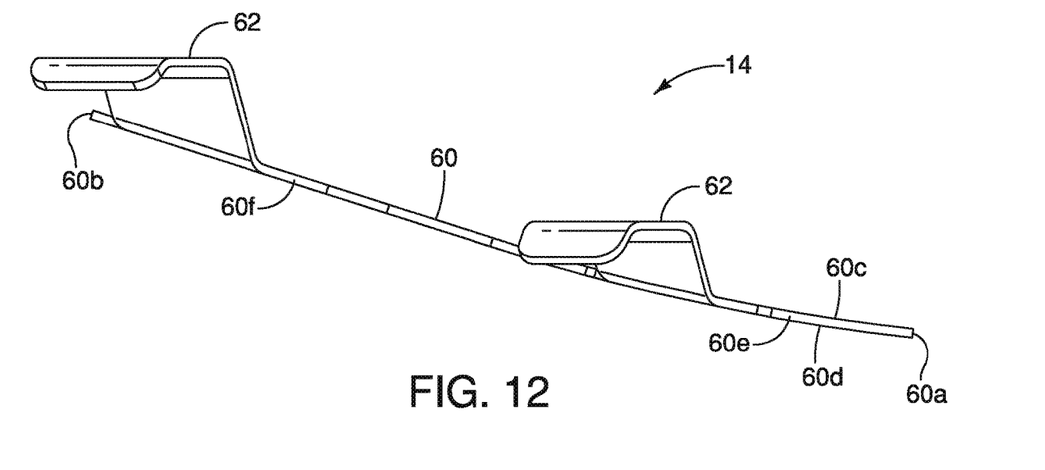
FIG. 12 an outboard side view of the reinforcing panel shown removed from the vehicle in accordance with the exemplary embodiment.
Figure 13:
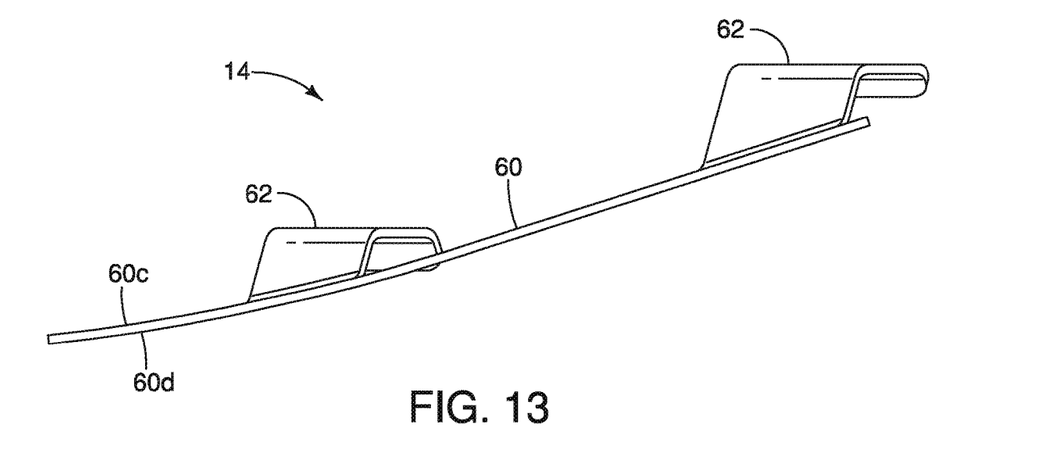
FIG. 13 an inboard side view of the reinforcing panel shown removed from the vehicle in accordance with the exemplary embodiment.
Figure 14:
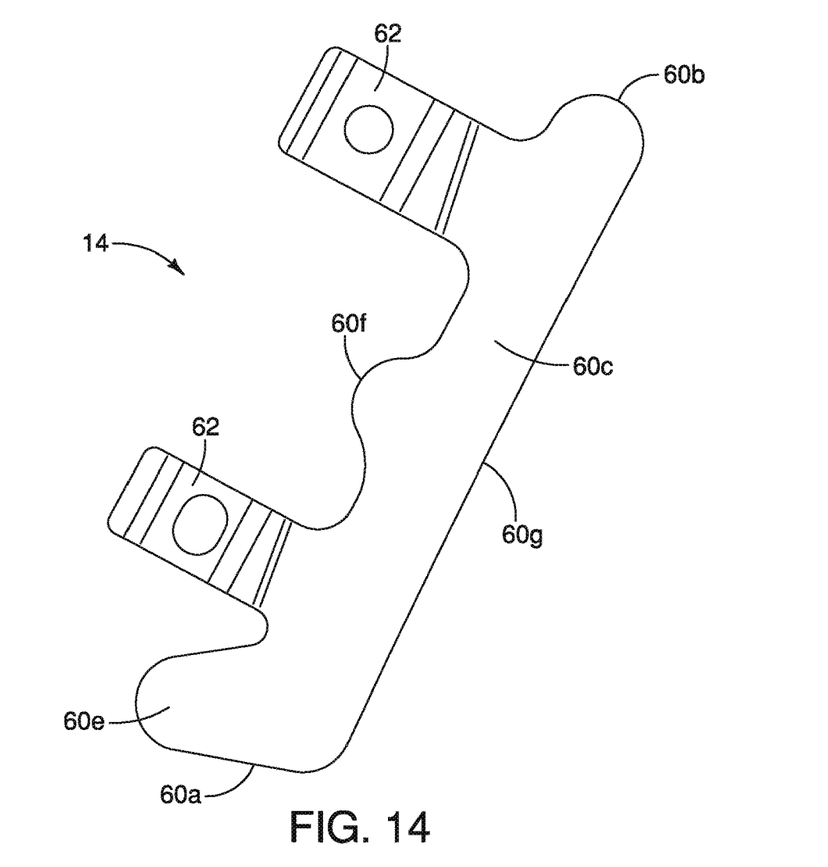
FIG. 14 a top view of the reinforcing panel shown removed from the vehicle in accordance with the exemplary embodiment.
Figure 15:
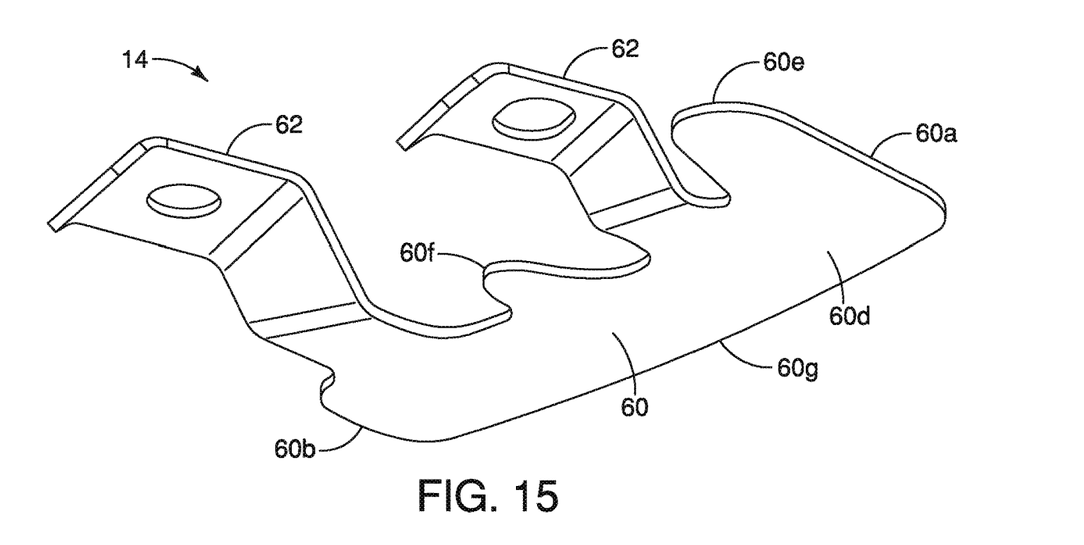
FIG. 15 a bottom perspective view of the reinforcing panel shown removed from the vehicle in accordance with the exemplary embodiment.

As shown in FIGS. 4, 6 and 9 there are other elements of the unibody construction of the floor structure 20 that support the side floor panel 46. For example, a cross-beam member 72 has a first end welded to the rear side member 56 and a second end welded to the door sill 24 and/or the inner wheel well portions 22.

As shown in FIGS. 4 and 6, during the process of assembling the floor structure 20, initially the reinforcing member 14 is temporarily welded only to the side floor panel 46 via temporary welds \VT. Thereafter, the main portion 60 of the reinforcing member 14 is permanently welded to the side floor panel 46 and the gusset 70 of the rear side member 56d via permanent welds W. The permanent welds W are triple welds, fixing three layers of metal together. Specifically, each permanent weld W welds the reinforcing member 14 the side floor panel 46 and the gusset 70 of the rear side member 56d together. It should be understood that the temporary welds WT do not need to be overly strong. However, the permanent welds W are preferably, for example, formed using an arc welder that is a high energy weld capable of welding three layers together forming a triple weld.

The various panels that define the floor structure 20 includes a plurality of panels that have a first thickness. Specifically, at least the side floor panel 46 has a thickness equal to the first thickness. The first thickness can be anywhere between 0.5 mm and 1.0 mm, but in the depicted embodiment is 0.65 mm. The reinforcing member 14 has a second thickness that is greater than the first thickness. The second thickness can be any value greater than 1.0 mm but can be less than 2.5 mm. In the depicted embodiment, the second thickness is 1.4 mm. The rear side member 56 has a third thickness that is greater than the first thickness. The third thickness of the rear side member 56 can be greater or smaller than the second thickness. However, in the depicted embodiment, the second thickness and the third thickness are the same (are equal). It should be understood from the drawings and the description herein that all panels and elements of the floor structure 20 are made of steel or steel alloys. Alternatively, the floor structure 20 can be made of aluminum or an aluminum alloy.

The inclusion of the reinforcing member 14 provides the vehicle body structure 12 with added resistance to deformation of the vehicle body structure in response to a impact event where the impact is rearward of or at a rear area of the rear door 42. The inventors have observed that comparing impact events where the vehicles 10 have the reinforcing member 14 with vehicles 10 that are without the reinforcing member 14, the overall deformation and cost of repairs to the vehicle 10 are greater in vehicles 10 without the reinforcing member 14. In other words, inclusion of the reinforcing member 14 in a vehicle 10 that experiences an impact event as described above reduces overall deformation of the vehicle 10 and reduces impact event repair costs of the vehicle 10.

The various vehicle elements, other than the reinforcing member 14, are basically conventional components that are well known in the art. Since these vehicle elements are well known in the art, these structures will not be discussed or illustrated in detail herein, Rather, it will be apparent to those skilled in the art from this disclosure that the components can be any type of structure and/or programming that can be used to carry out the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward" "rearward", "above", "downward", "vertical", "horizontal", "below" and "transverse" as well as any other similar directional tennis refer to those directions of a vehicle equipped with the vehicle body structure. Accordingly, these terms, as utilized to describe the present invention should be interpreted relative to a vehicle equipped with the vehicle body structure.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle body structure, comprising:
   a floor structure that at least partially defines a door sill portion, a rear wheel well portion and a rear seat support portion;
   a rear side member that extends under and is directly attached to a lower surface of the floor structure adjacent to the door sill portion and a forward section of the rear wheel well portion; and
   a reinforcing member that is fixedly attached to an upper surface of the floor structure adjacent to the door sill portion and the forward section of the rear wheel well portion,
   the rear side member being a structural beam having at least one gusset portion extending along one side of the rear side member, the at least one gusset portion being welded to the lower surface of the floor structure, and
   the reinforcing member including a main portion welded to the upper surface of the floor structure above the at least one gusset portion of the rear side member such that the at least one gusset portion of the rear side member and the main portion of the reinforcing member sandwich the floor structure therebetween.

2. The vehicle body structure according to claim 1, wherein
   the floor structure includes a plurality of panels that have a first thickness and the reinforcing member has greater thickness than the first thickness, and
   the rear side member is made of a steel having a third thickness greater than the first thickness.

3. The vehicle body structure according to claim 2, wherein
   the second thickness and the third thickness are the same.

4. The vehicle body structure according to claim 2, wherein
   the reinforcing member includes a main portion and the rear side member includes a gusset portion such that the main portion of the reinforcing member, a portion of the floor structure and the gusset portion of the rear side member are attached to one another by a plurality of weld, each of the plurality of welds penetrating the main portion, the floor structure and the gusset portion fixedly attaching them together.

5. The vehicle body structure according to claim 1, wherein
   the floor structure includes a plurality of panels that have a first thickness and the reinforcing member has greater thickness than the first thickness.

6. The vehicle body structure according to claim 5, wherein
   the rear side member is made of a steel having a third thickness greater than the first thickness, the second thickness and the third thickness being the same.

7. A vehicle body structure, comprising:
a floor structure that at least partially defines a door sill portion, a rear wheel well portion and a rear seat support portion;
a rear side member that extends under and is directly attached to a lower surface of the floor structure adjacent to the door sill portion and a forward section of the rear wheel well portion; and
a reinforcing member that is fixedly attached to an upper surface of the floor structure adjacent to the door sill portion and the forward section of the rear wheel well portion,
the floor structure including a plurality of panels that have a first thickness and the reinforcing member having a greater thickness than the first thickness,
the rear side member being made of a steel having a third thickness greater than the first thickness, the second thickness and the third thickness being the same, and
the reinforcing member including a main portion and a pair of alignment portions.

8. The vehicle body structure according to claim 7, wherein
the main portion of the reinforcing member is contoured to overlay the upper surface of the floor structure at the rear wheel well portion.

9. The vehicle body structure according to claim 8, wherein
the main portion of the reinforcing member is contoured to overlay the upper surface of the floor structure at the rear wheel well portion.

10. The vehicle body structure according to claim 9, wherein
the pair of alignment portions extend from the main portion such that they extend above an upper surface of the main portion.

11. The vehicle body structure according to claim 10, wherein
the pair of alignment portions are dimensioned and shaped for engagement with a robot during welding of the reinforcing member to the floor structure.

12. The vehicle body structure according to claim 11, wherein
the pair of alignment portions are spaced apart from the upper surface of the floor structure with the main portion of the reinforcing member welded to the floor structure.

13. A vehicle body structure, comprising:
a floor structure that at least partially defines a door sill portion, a rear wheel well portion and a rear seat support portion;
a rear side member that extends under and is directly attached to a lower surface of the floor structure adjacent to the door sill portion and a forward section of the rear wheel well portion; and
a reinforcing member that is fixedly attached to an upper surface of the floor structure adjacent to the door sill portion and the forward section of the rear wheel well portion,
the reinforcing member including a main portion and a pair of alignment portions.

14. The vehicle body structure according to claim 13, wherein
the main portion of the reinforcing member is contoured to overlay the upper surface of the floor structure at the rear wheel well portion.

15. The vehicle body structure according to claim 14, wherein
the main portion of the reinforcing member is contoured to overlay the upper surface of the floor structure at the rear wheel well portion.

16. The vehicle body structure according to claim 15, wherein
the pair of alignment portions extend from the main portion such that they extend above an upper surface of the main portion.

17. The vehicle body structure according to claim 16, wherein
the pair of alignment portions are dimensioned and shaped for engagement with a robot during welding of the reinforcing member to the floor structure.

18. The vehicle body structure according to claim 17, wherein
the pair of alignment portions are spaced apart from the upper surface of the floor structure with the main portion of the reinforcing member welded to the floor structure.

* * * * *